United States Patent Office 2,803,662
Patented Aug. 20, 1957

2,803,662

ETHERS OF 4.8.8-TRIMETHYL-9-METHYLENE-(1,3,3)-BICYCLO-4-NONANOL

Max Stoll, Geneva, Switzerland, assignor to Firmenich & Co., successeurs de la societe anonyme M. Naef & Cie, a corporation of Switzerland No Drawing. Application June 28, 1954, Serial No. 439,921

13 Claims. (Cl. 260—611)

This invention relates to a novel composition of matter with a strong woody amber-like scent, to new chemical compound and to a process of making the same.

According to this invention, dihydro-α-ionone is subjected to a ring closing by treating it at low temperature with a solution of a mineral acid or boron trifluoride in a lower aliphatic monohydric alcohol (ROH). By low temperature is meant a temperature from about −13° C. up to about 20° C. Usually the reaction is run at about 0° or less, at least during the first part of the reaction. Mineral acids and boron fluoride have a strong affinity for electrons, that is, they produce positive ions available from the acid, that is, the ionized hydrogen is an atom of hydrogen from which an electron is missing. In a similar manner boron trifluoride comprising boron surrounded by 6 electrons requiring 8 to insure stability of its electron ring also produces positive ion. This property of a compound to make available hydrogen ions needed for cyclization is referred to herein as an electrophilic agent. During this treatment, the dihydro-α-ionone (Formula I) adds a proton to the keto group becomes a secondary hydroxy group (Formula II) which is immediately etherified by the surrounding alcohol (ROH) to an ether (Formula III). The latter cyclises to the carbonium ion (Formula IV) which becomes in turn the unsaturated ether of Formula V. In these formulae R may be —CH₃, C₂H₅—, C₃H₇—, C₄H₉—, etc.

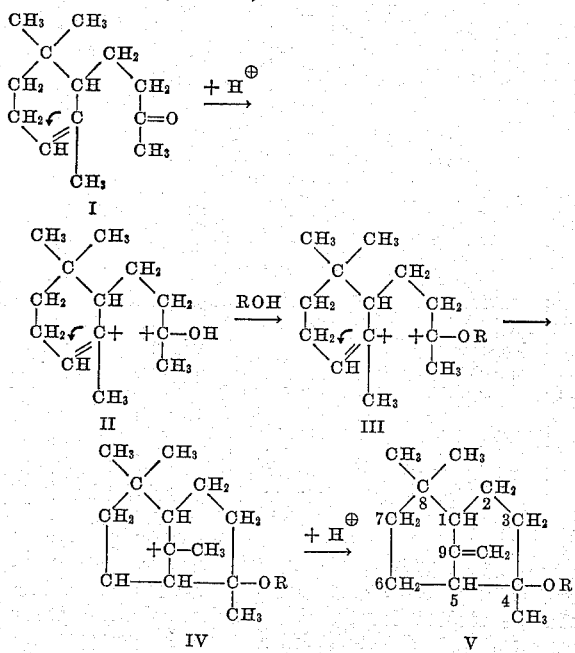

If R is —CH₃, the yield of the product of Formula V is nearly quantitative. As the radical R gets more heavy, the yield decreases and a certain amount of hydrocarbons are formed.

The ethers of Formula V (R being an alkyl radical) of the aforesaid tertiary alcohol of Formula V in which R=H, are now compounds and therefore a first subject of the present invention. They are characterized by the following physical constants:

| Formula V | Boiling point | Density | Refractive index |
|---|---|---|---|
| R=CH₃— | 106–107° at 8 mm. Hg. | $\frac{18}{4}$ 0.950 | $\frac{17.5}{D}$ 1.492 |
| R=C₂H₅— | 110–111° at 8 mm. Hg. | $\frac{20}{4}$ 0.929 | $\frac{19.8}{D}$ 1.484 |
| R=CH₃CH₂CH₂— | 142–144° at 18 mm. Hg. | $\frac{21}{4}$ 0.922 | $\frac{21}{D}$ 1.482 |
| R=CH₃ĊHCH₃ | 133–135° at 16 mm. Hg. | $\frac{19.5}{4}$ 0.925 | $\frac{20}{D}$ 1.482 |
| R=CH₃CH₂CH₂CH₂— | 145–146° at 12 mm. Hg. | $\frac{20}{4}$ 0.923 | $\frac{21}{D}$ 1.482 |
| R=(CH₃)₂CHCH₂— | 147–148° at 17 mm. Hg. | $\frac{20}{4}$ 0.915 | $\frac{20.5}{D}$ 1.479 |

All these new substances have new and interesting odours which make them valuable raw materials for the perfumery industry. In the series of ethers, the odour intensity decreases with the increasing molecular weight of the ethers.

If R is

the cyclization is faster than the etherification. One gets therefore a certain amount of the tertiary alcohol of Formula V, in which R=H—, instead of the corresponding ether. Another subject of the present invention is therefore a new composition of matter having the general chemical Formula V in which R is a hydrogen atom and is designated as 4.4.8-trimethyl-9-methylene-(3.3.1)-bicyclo-4-nonanol. This new substance is a mixture of two stereoisomeric compounds and is characterized by the following physical constants: Boiling point: 124° under 14 mm. Hg;

Density $\frac{22}{4}$=0.967 refractive index $n_D^{18}$=1.501. About half of the product crystallizes and melts at 71° C. The crystallized part gives an allophanate melting at 190° C. and the liquid part one melting at 179° C. The constitution of the new compounds has been established by ozonolysis and infrared spectrography.

A further object of the present invention is the process of making the aforesaid new composition of matter. It is characterized by the treatment of dihydro-α-ionone in an alcoholic solution of lower monohydric alcohols with an electrophilic agent at low temperature. If the alcohol is a secondary alcohol having more than 3 carbon atoms, the reaction produces, beside hydrocarbons, 4.4.8-trimethyl-9-methylene-(3.3.1)-bicyclo-4-nonanol. If the alcohols have less carbon atoms, then the formation of the corresponding ether of said alcohol is preponderant.

*Example 1.—Preparation of the ethers of 4.4.8-trimethyl-9-methylene-(3.3.1)-bicyclononanol-4*

One prepares a solution of 145 g. of dry hydrochloric acid in 2000 ml. of an aliphatic alcohol in the dry state. After having cooled this solution to 0° C., 120 g. of dihydro-α-ionone is added in one portion. After the solution has been homogenized, it is left for 24 hours at −3° C. After this time the solution is poured on ice and extracted with petroleum ether between 50 and 70° C. The reaction product is then distilled twice over sodium. The process is the same for all the ethers listed in the table in column 2, with the exception of the reaction time which is increased with increasing molecular weight of the specific alcohol used.

The yields are 80% for the lower alcohols. The higher alcohols give poorer yields. A chromatography over $Al_2O_3$ (act. III) removes small quantities of hydrocarbons and traces of oxides and improves the odor. The term (act. III) refers to the method of Brockmann as described in Chem. Ber. 74, 73 (1941). A similar effect is obtained by fractional distillation, the first running being discarded. The physical constants of the different ethers are listed in the table above.

*Example 2.—Preparation of 4.4.8-trimethyl-9-methylene-(3.3.1)-bicyclononanol-4*

A solution of 50 g. dry hydrochloric acid in 200 g. secondary butanol is prepared and cooled to −10 to −13° C. To this solution is added in one portion 20 g. dihydro-α-inone. This solution is allowed to stand for 10 days at −13° C. After this time the solution is poured on ice and extracted with ether. After evaporation of the latter, the reaction product is distilled eventually over $K_2CO_3$ or $CH_3ONa$ to remove small quantities of chlorine and afterwards treated with 10 g. trimethyl-borate at 120–160° C., at the beginning at ordinary pressure and finally under high vacuum. Hydrocarbons and non-reacted ketone distil over and the borate of the alcohol remains in the distilling flask. Saponification with methanolic KOH yields the pure 4.4.8-trimethyl-9-methylene-(3.3.1)-bicyclononanol-4 with the following physical constants: B. P. 14 mm. Hg pressure=124–125° C.

$$\text{Density } \frac{22.5}{4} = 0.968$$

refraction $n_D^{18} = 1.502$.

The product crystallizes and can be separated in a crystallized part and a liquid part. The former melts at 70–71° C. and has a boiling point of 9 mm.=115° C.; the latter has B. P. 10 mm.=100−101° C.; $d_4^{20.4}=0.965$; $n_D^{20}=1.500$. The crystallized part gives an allophanate melting at 190° C. From the liquid part one obtains an allophanate with the melting point 179° C.

(The allophanates were prepared along the lines given by Zobrist and Schinz, Helvetica Chimica Acta, vol. 35, 2383 (1952)). Yield: 25–35% of the transformed dihydro-α-ionone.

*Example 3.—Preparation of 4.4.8-trimethyl-9-methylene-(3.3.1)-bicyclononane-4-ethoxyl*

To a cold solution of 80 g. $H_2SO_4$ conc. in 400 ml. ethanol are added 25 g. of dihydro-α-ionone. This solution is allowed to stand for three days at 0° C. Then during eight hours the temperature is raised to 20° C. Afterwards the reaction mixture is poured into water and extracted with ether. One obtains 26 g. of a reaction product with a carbonyl content of about 45% (oximation). The unreacted dihydroionone is separated by its combination with $NaHSO_3$. The non-ketonic part is extracted with ether and distilled several times over sodium. One obtains finally a fraction of pure 4.4.8-trimethyl-9-methylene-(3.3.1)-bicyclononane-4-ethoxyl boiling under 7 mm. Hg. pressure at 106–108° C. and having a density of $$\frac{20}{4} = 0.930$$

and $n_D^{20}=1.484$. Yield 70% of the reacted dihydro-ionone.

*Example 4.—Preparation of 4.4.8-trimethyl-9-methylene-(3.3.1)-bicyclononane-4-isobutoxyl*

25 g. of dihydro-α-ionone are introduced into a cooled mixture of 80 g. $H_2SO_4$ conc. in 380 g. secondary butyl alcohol. After standing for 19 days at 0° C., the reaction mixture is kept for some hours at 20° C. After treatment as in Example 2, one finally obtains a product distilling under 0.17 mm. Hg pressure at 79–82°. Allophanate M. P. 190° C. and 178° C. Yield: 25% of the transformed dihydro-α-ionone.

*Example 5.—Preparation of 4.4.8-trimethyl-9-methylene-(3.3.1)-bicyclononane-4-ethoxyl*

To a mixture of 60 g. $BF_3$ in 200 g. ethanol are added 20 g. of dihydro-α-ionone. This solution is kept for 75 hours at 0° C. The reaction product is then poured on ice-water and extracted with ether. The latter is washed with KOH 10% and water. The solvent is distilled off and the remaining 20.8 g. are boiled over sodium at 120° C. and then distilled. B. P. 10 mm. 108–120°, 14.9 g. A second treatment over sodium leaves 14.6 g. of pure 4.4.8 - trimethyl - 9 - methylene - (3.3.1) - bicyclononane-4-ethoxyl. B. P. 113–115° C. under 11 mm. Hg; $d_4^{18.5}=0.929$; $n_D^{20}=1.484$.

What I claim is:

1. Stereoisomeric compounds of 4.4.8-trimethyl-9-methylene-(3.3.1)-bicyclo-4-nonanols having the structure

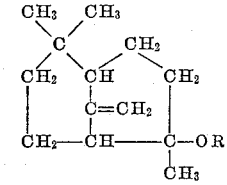

wherein R is a member of the group consisting of hydrogen and lower alkyl radicals.

2. A stereoisomer of 4.4.8-trimethyl-9-methylene-(3.3.1)-bicyclo-4-nonanol.
3. The methyl ether of 4.4.8-trimethyl-9-methylene-(3.3.1)-bicyclo-4-nonanol.
4. The ethyl ether of 4.4.8-trimethyl-9-methylene-(3.3.1)-bicyclo-4-nonanol.
5. The propyl ether of 4.4.8-trimethyl-9-methylene-(3.3.1)-bicyclo-4-nonanol.
6. The butyl ether of 4.4.8-trimethyl-9-methylene-(3.3.1)-bicyclo-4-nonanol.
7. Process of forming stereoisomers of 4.4.8-trimethyl-9-methylene-(3.3.1)-bicyclo-4-nonanols having the structure

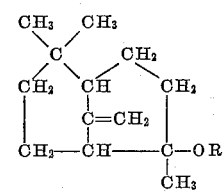

wherein R is a member of the group consisting of hydrogen and lower alkyl, which comprises contracting dihydro alpha ionone in a solution of a lower monohydric aliphatic alcohol with a strong electrophilic agent at low temperature not exceeding ambient temperature for an extended period of several hours.

8. Process as defined in claim 7, wherein the strong electrophilic agent is selected from the group consisting of hydrochloric acid, sulfuric acid, and boron trifluoride.

9. Process of forming a stereoisomer of 4.4.8-trimethyl-9-methylene-(3.3.1)-bicyclo-4-nonanol comprising contacting dihydro-alpha-ionone in a solution of isobutanol with a strong electrophilic agent for a period of at least several hours at a temperature below about 20° C.

10. Method of forming stereoisomers of the methyl ether of 4.4.8-trimethyl-9-methylene-(3.3.1)-bicyclo-4-nonanol comprising contacting dihydro-alpha-ionone in a solution of methanol with a strong electrophilic agent for an extended period of at least several hours at a temperature not exceeding 20° C.

11. The process of forming stereoisomers of the ethyl ether of 4.4.8-trimethyl-9-methylene-(3.3.1)-bicyclo-4-nonanol comprising contacting dihydro-alpha-ionone in a solution of ethanol with a strong electrophilic agent for an extended period of at least several hours at a temperature not exceeding 20° C.

12. The method of forming stereoisomers of the propyl ether of 4.4.8-trimethyl-9-methylene-(3.3.1)-bicyclo-4-nonanol comprising contacting dihydro-alpha-ionone in a solution of propyl alcohol with a strong electrophilic agent for an extended period of at least several hours at a temperature not exceeding 20° C.

13. The process of forming stereoisomers of the butyl ether of 4.4.8-trimethyl-9-methylene-(3.3.1)-bicyclo-4-nonanol comprising contacting dihydro-alpha-ionone in a solution of butanol with a strong electrophilic agent for an extended period of at least several hours at a temperature not exceeding 20° C.

References Cited in the file of this patent

Patterson et al.: The Ring Index, p. 155, publ. by Reinhold Pub. Corp. (New York), (1940).

Royals: Industrial Engineering Chemistry (1946), vol. 38, November 5, pp. 546–548.

Royals: Advanced Organic Chemistry (1956), pp. 386, 387.